US005127150A

United States Patent [19]

[11] Patent Number: 5,127,150

[45] Date of Patent: Jul. 7, 1992

D'Entremont et al.

[54] HERMETIC MOTOR PROTECTOR

[75] Inventors: John R. D'Entremont, Foxboro, Mass.; Matthew L. Behler, Merrimack, N.H.; Gordon S. Swanson, Bellingham, Mass.

[73] Assignee: Texas Instruments Incorporated, Dallas, Tex.

[21] Appl. No.: 674,272

[22] Filed: Mar. 22, 1991

Related U.S. Application Data

[62] Division of Ser. No. 452,182, Dec. 18, 1989, Pat. No. 5,023,586.

[51] Int. Cl.[5] .......................... H05B 3/00; B23Q 3/00; H01C 17/28

[52] U.S. Cl. ........................................ 29/611; 29/464; 29/467; 29/468; 29/619; 29/622

[58] Field of Search ................. 29/611, 619, 622, 621, 29/464, 467, 468; 337/104

[56] References Cited

U.S. PATENT DOCUMENTS

| | | | |
|---|---|---|---|
| 3,636,622 | 1/1972 | Schmitt | 29/756 |
| 4,376,926 | 3/1983 | Senor | 337/104 |
| 4,533,894 | 8/1985 | Bishop et al. | 337/102 |
| 4,741,090 | 5/1988 | Monnier | 29/464 |
| 4,851,804 | 7/1989 | Yang | 337/104 |

*Primary Examiner*—P. W. Echols
*Attorney, Agent, or Firm*—Russell E. Baumann; Grossmann René E.; Richard L. Donaldson

[57] ABSTRACT

A motor protector having a can and internal electrical contact is hermetically sealed to a disk-shaped header of conductive material having a flattened edge for orientation during fabrication with spaced conductive pins sealed in and insulated therefrom. A heater-support with holes for fabrication is bonded to one conductive pin, a bimetallic element parallel to the axes of the pins having a contact element normally contacting the can contact. A heater without right angle bends is bonded to each of the electrically conductive pins, is spaced from the movable contact and rests parallel to the axes of the conductive pins. The motor protector is fabricated by providing a fixture having two depressions, one somewhat in the shape of the movable contact with upwardly extending pins for mating with the support apertures therein and the second for receiving the header in an upright position and adjacent the first. The support is placed on the fixture with the pins extending therethrough for support orientation. The header is then oriented in its fixture depression with one of the pins through the header resting against the support and is bonded to the support. The movable contact is then disposed in the proper depression and welded to the support. Slider brackets then receive the heater thereon and position it on the pins to which they are secured. The formed motor protector portion is placed in the cans and hermetically sealed thereto with the contact within the can disposed against the contact element on the movable contact member.

9 Claims, 2 Drawing Sheets

HERMETIC MOTOR PROTECTOR

This application is a division of application Ser. No. 452,182, filed Dec. 18, 1989 now U.S. Pat. No. 5,023,586.

BACKGROUND OF THE INVENTION

1. Field of the Invention

This invention relates to hermetically sealed electric motor protectors.

2. Brief Description of the Prior Art

Small sealed motor protector devices having a snap-acting, thermally responsive member acting as a switch element are well known in the art. Motor protectors of this type are generally provided with a snap-acting bimetallic member controlling one terminal of a normally closed switch which, upon being heated to a predetermined temperature, snaps to open the switch and cuts off current to the motor. A typical such motor protector is set forth in Canadian Patent No. 892,168 of Leith B. Young et al. which is assigned to the assignee of the present invention. Other prior art motor protectors are set forth in U.S. Pat. No. 4,376,926 of Senor, also assigned to the assignee of the present invention as well as Klixon brand motor protectors sold by the assignee of the present invention and particularly models 4HM, 7896 and 7897. Such prior art motor protectors have provided reliable motor protection for a multiple of heat generating potential fault conditions, such as, for example, short circuits, overload, locked rotor and the like for many years. However, they have been relatively expensive to fabricate. One reason for this relatively high fabrication cost has been because a plane through the axis of the pins exiting prior art motor protector has been perpendicular to the plane of the snap acting element, this arrangement preventing the use of relatively economical fabrication techniques. Accordingly it is always desired to provide improvements to such motor protectors by way of decreased fabrication cost, improved performance or a combination thereof, preferably with a device which is completely interchangeable with the prior art motor protectors.

SUMMARY OF THE INVENTION

In accordance with the present invention, the above-noted desired improvements over the prior art are obtained.

Briefly, there is provided a motor protectors having an electrically conductive can, preferably steel, having an electrical contact member on the interior thereof for making contact with a contact member on the remainder of the motor protector mechanism.

The remainder of the motor protector mechanism comprises a disk-shaped header of weldable, high strength, low cost material having an appropriate coefficient of thermal expansion, preferably, steel having flattened upper and lower edges for proper orientation during fabrication. A pair of electrically conductive pins, preferably formed on copper cored 446 stainless steel or alloy 52, spaced from each other and electrically sealed in and insulated from the header by a glass sealant, preferably a compression glass with appropriate adhesion and strength, extend through both opposed major surfaces of the header. An offset support and heater element having its major surface in a plane substantially parallel to a plane through the axes of the conductive pins and having pilot holes therethrough for use in device fabrication is bonded to one of the conductive pins. A movable contact in the form of a bimetallic element extending in a plane substantially parallel to the plane passing through the axes of the electrically conductive pins and having a contact element on one end portion thereof is secured to the support via a slug, the contact thereon normally contacting the contact member on the can interior. A heater element, preferably of flexible material and having no right angle bends, preferably omega shaped, is bonded to each of the electrically conductive pins, is spaced from the movable contact and rests in a plane substantially parallel to the plane resting through the axes of the conductive pins. The elimination of right angle bends is believed to improve the longevity of the heater by maintaining a substantially constant resistance along the entire length thereof and thereby avoiding the existence of hot spots therein. The can is hermetically sealed to the header to provide complete hermeticitiy within the can with the heater, movable contact and support disposed within the hermetically sealed can.

In operation, current from the motor start winding will pass through the heater element and will cause snapping of the movable contact in the event the current in the heater element is too high, thereby opening the switch and turning off current to the motor main winding. Current from the motor main winding passes through the support and movable contact to the can. When the main winding current is excessive, heat from the support and the movable contact itself will cause snapping of the movable contact to open the circuit to the motor main winding. It is, of course, apparent that a combination of heat from any or all of the above mentioned heat producing elements as well as ambient heat can cause the switching action take place. The switching takes place when the movable contact has been heated to a predetermined temperature as is well known in the art.

The above described hermetic motor protector is fabricated by initially providing a fixture having a pair of depressions, a first one in the shape of the movable contact and the bottom portion of the support with a pair of upwardly extending pins for mating with the apertures in the support and the second depression adjacent and communicating with the first depression for receiving the header in an upright position. Initially, the support is placed on the fixture with the fixture pins extending therethrough for proper orientation. The header is then disposed in the fixture depression therefor with a flattened portion of the header at the bottom of the depression for orientation. In this orientation, one of the electrically conductive pins through the header will rest against the bottommost portion of the support and is bonded to the support in this position, preferably by resistance or spot welding. The movable contact is then disposed in the fixture depression therefor and the slug portion thereof, which extends through the movable contact, is then welded to the support, preferably by resistance or spot welding. A pair of slider brackets on the fixture is then pushed in, receives the heater thereon and positions the heater so that the opposing end portions thereof are disposed on the electrically conductive pins. The heater is then secured to the pins, preferably by resistance or spot welding. Both welds can be made simultaneously at this time to eliminate a manufacturing step. The portion of the hermetic motor protector formed in the fixture is now removed from the fixture and placed in the can so that the contact within the can is disposed against the contact element on the movable contact member and is hermetically sealed thereto, preferably with a resistace seam weld.

DESCRIPTION OF THE PREFERRED EMBODIMENT

Figure 1:
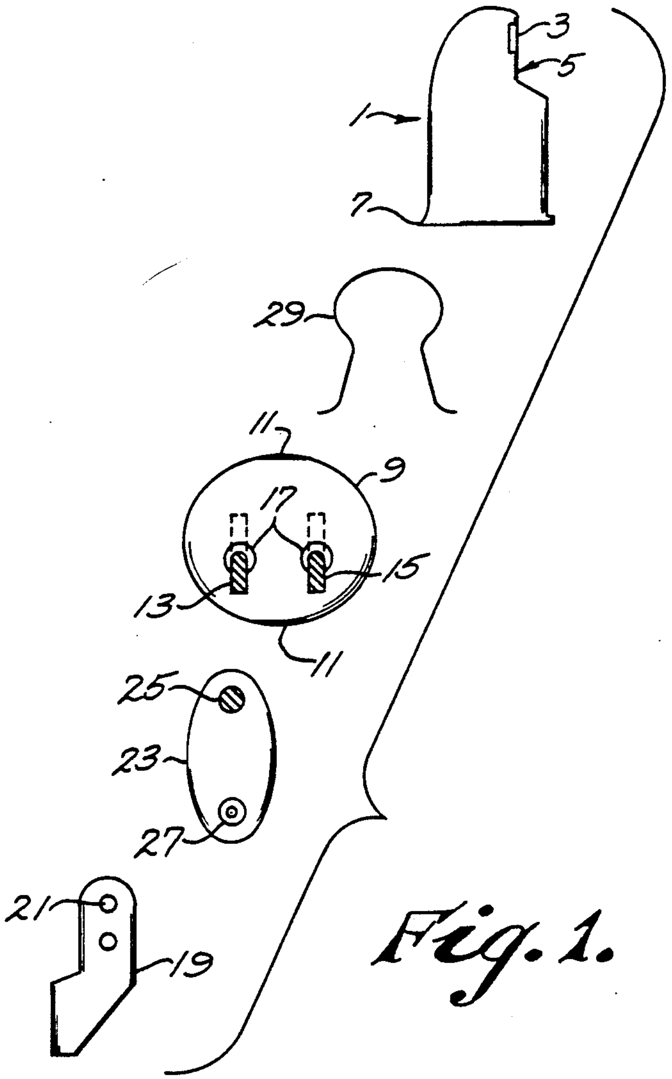
FIG. 1 is an exploded view of an hermetic motor protectotor in accordance with the present invention.
Figure 2:
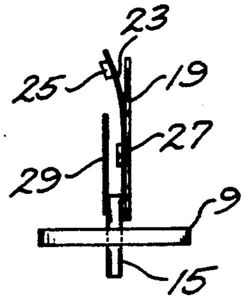
FIG. 2 is a side view of the hermetic motor protector in accordance with teh present invention with the can removed.
Figure 3:
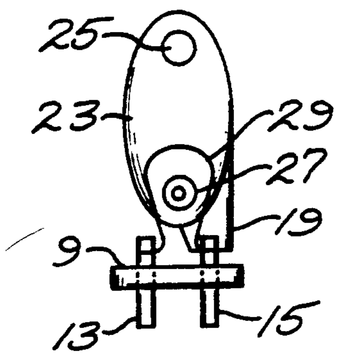
FIG. 3 is a front view of the hermetic motor protector in accordance with the present invention with the can removed.

Referring first to FIGS. 1 to 3, there is shown a preferred embodiment of the hermetic motor protector in accordance with the present invention. The motor protector includes an external can or housing 1, preferably formed of cold rolled steel, having an electrical contact member 3 of steel backing with copper inlay and a silver face on the interior thereof for making contact with a contact member on the remainder of the motor protector mechanism as will be explained hereinbelow. The can 1 has an indentation 5 at the top portion thereof in which the contact member 3 is disposed and an annular flange portion 7 around its lower open end.

The remainder of the motor protector mechanism which is hermetically sealed to the can 1 at the flange portion 7 thereof comprises a disk-shaped header 9 of cold rolled steel having flattened upper and lower edges 11 for orientation in a fixture during fabrication as will be explained hereinbelow. A pair of electrically conductive pins 13 and 15 kof copper cored stainless steel, spaced from each other and hermetically sealed in and electrically insulated from the header 9 by a glass sealant 17, extend through both opposed major surfaces of the header. An offset support and heater element 19 of a resistice material, preferably Chromel A or 1010 steel, having its major surface in a plane substantially parallel to a plane through the axes of the conductive pins 13 and 15 and having a pair of pilot holes 21 therethrough for use in device fabrication is bonded to one of the conductive pins 13, 15. A movable contact 23 in the form of a standard snap-acting bimetallic element, normally extending generally in a plane substantially parallel to the plane passing through the axes of the electrically conductive pins and having a contact element 25 of material similar to that of contact 3 on one end portion thereof, is secured to the support and heater element 19 via a slug 27 of cold rolled steel welded thereto, the contact element thereon normally contacting the contact member 3 on the can interior.

A heater element 29, preferably or resistance materials with high strength at high temperatures suchas Chromel A and having no right angle bends, preferably omega shapeed, is welded to each of the electrically conductive pins 13 and 15, is spaced from the movable contact 23 and rests in a plane substantially parallel to the plane passing through the axes of the conductive pins. The can 1 is hermetically sealed to the header 9 along the annular flange portion 7 of the can to provide complete hermeticity within the can with the heater 29, movable contact 23 and support 19 disposed within the hermetically sealed can.

In operation, current from the motor start winding to which the motor protector is coupled will pass through the heater element 29 and will cause snapping of the movable contact 23 from the curved shape as shown to a substantially planar shaoe in the event the current in the heater element is too high, thereby opening the switch by separating the contacts 3 and 25 and thereby turning off current to the motor main winding. Current from the motor main winding passes through the pin 15, support 19 and movable contact 23 to the can 1 via contacts 3 and 25. When the main winding current is excessive, heat from the support 19 and the movable contact 23 itself will cause snapping of the movable contact to separate the contact elements 3 and 25 and open the circuit to the motor main winding. It is, of course, apparent that a combination of heat from any or all of the above mentioned heat producing elements as well as ambient heat can cause the switching action to take place. The switching takes place when the movable contact 3 has been heatd to a predetermined temperature at which will snap to a new position as is well known in the art.

Figure 4:
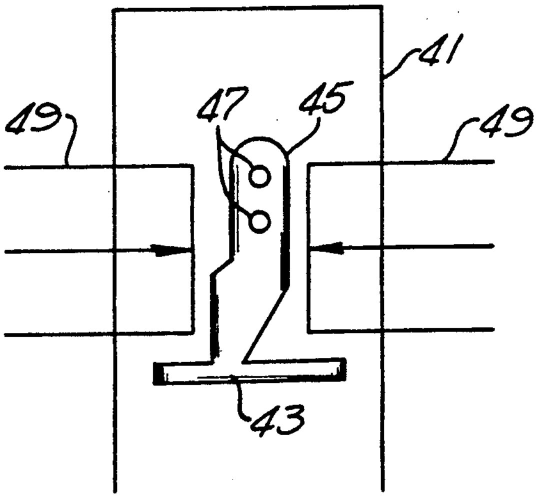
FIG. 4 is a top view of a fixture for use in fabrication of the hermetic motor protector in accordance with the present invention.

The above described hermetic motor protector is fabricated, as shown with reference to FIG. 4, by initially providing a fixture 41 having a pair of depressions 43 and 45. The first depression 45 is in the shape of the movable contact 23 and the bottom portion of the support 19 with a pair of upwardly extending pins 47 for mating with the apertures 21 in the support 19. The second depression 43 is disposed adjacent and communicating with the first depression and has a flat bottom portion and rounded side walls in the shape of the header 9 for receiving the header in an upright position with a flattened portion 11 of the header resting on the flat bottom portion of the depression 43.

Initially, the support 19 is placed on the fixture 41 with the fixture pins 47 extending through the apertures 21 therein for proper orientation. The header 9 is then disposed in the fixture depression 43 therefor with a flattened portion 11 of the header at the bottom of the depression for orientation. In this orientationk one of the electricaly conductive pins 13, 15 through the header will rest against the bottommost portion of the support 19 and is bonded to the support in this position, preferably by resistance or spot welding. The movable contact 23 is then disposed in the fixture depression 45 therefor and the slug portion 27 thereof, which extends through the movable contact, is then welded to the support 19, preferably by resistancce or spot welding. A pair of slider brackets 49 on the fixture is then pushed inwardly as shown by the arrow, receives the heater 29 thereon and positions the heater so that the opposing end portions thereof are disposed on the electrically conductive pins 13 and 15. The heater 29 is then secured to the pins 13 and 15, preferably by resistance or spot welding. Both welds can be made simultaneously at this time to eliminate a manufacturing step. The portion of the hermetic motor protector formed in the fixture 41 is now removed therefrom and placed in the can 1 so that the contact 3 within the can is disposed against the contact element 25 on the movable contact member 23. The flange portion 7 of the can 1 is then hermetically sealed to the header 9, preferably with a resistance seam weld, to form the completed motor protector. Terminations can be placed on the exterior portions of the pins 13 and 15, if desired.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A method of fabricating a motor protector comprising the steps of:

(a) providing a fixture having a substantially flat bottom;

(b) placing a heater-support in said fixture;

(c) placing a header having two pins therethrough in said fixture said pins being oriented so that the axis of each pin passes through a plane parallel to said flat bottom and one of said pins rests on said heater-support;

(d) securing said one of said pins to said heater-support;

(e) placing a heater on said pins;

(f) securing said heater to said pins; and (g) sealing a can to said header.

2. The method of claim 1, wherein said fixture has an upwardly extending orienting means therein and said heater support is oriented in said fixture relative to said orienting means.

3. The method of claim 2 wherein step (e) includes providing a slider member on said fixture, sliding said slider member into a predetermined position and placing said heater on said slider member and on said pins.

4. The method of claim 2 wherein said step of sealing is hermetic sealing.

5. The method of claim 4 wherein step (e) includes providing a slider member on said fixture, sliding said slider member into a predetermined position and placing said heater on said slider member and on said pins.

6. The method of claim 1 wherein said step of sealing is hermetic sealing.

7. The method of claim 6 wherein step (e) includes providing a slider member on said fixture, sliding said slider member into a predetermined position and placing said heater on said slider member and on said pins.

8. The method of claim 1 wherein step (e) includes providing a slider member on said fixture, sliding said slider member into a predetermined position and placing said heater on said slider member and on said pins.

9. The method of claim 1 wherein said heater is in the shape of an omega and the opposite ends of the omega-shaped heater are disposed in the same plane and are welded simultaneously to respective pins.

* * * * *